United States Patent
Pind et al.

(10) Patent No.: US 9,193,895 B2
(45) Date of Patent: Nov. 24, 2015

(54) ADHESIVE FOR ROTOR BLADES FOR WIND POWER PLANTS

(75) Inventors: Martin Pind, Suzhou (CN); Bodil Olsen, Skaevinge (DK)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 13/997,500

(22) PCT Filed: Dec. 20, 2011

(86) PCT No.: PCT/EP2011/073392
§ 371 (c)(1),
(2), (4) Date: Jul. 18, 2013

(87) PCT Pub. No.: WO2012/084937
PCT Pub. Date: Jun. 28, 2012

(65) Prior Publication Data
US 2013/0288060 A1    Oct. 31, 2013

(30) Foreign Application Priority Data

Dec. 24, 2010    (EP) ................................ 10196962

(51) Int. Cl.
| | |
|---|---|
| C09J 175/04 | (2006.01) |
| B32B 27/40 | (2006.01) |
| C08G 18/32 | (2006.01) |
| C08G 18/36 | (2006.01) |
| C08G 18/48 | (2006.01) |
| C08G 18/66 | (2006.01) |
| C08G 18/76 | (2006.01) |
| C08G 18/42 | (2006.01) |

(52) U.S. Cl.
CPC ............ *C09J 175/04* (2013.01); *C08G 18/324* (2013.01); *C08G 18/3215* (2013.01); *C08G 18/36* (2013.01); *C08G 18/4244* (2013.01); *C08G 18/4829* (2013.01); *C08G 18/4854* (2013.01); *C08G 18/6629* (2013.01); *C08G 18/7664* (2013.01); *Y10T 428/31551* (2015.04)

(58) Field of Classification Search
CPC .......... C08G 18/3215; C08G 18/4854; C08G 18/6629; C08G 18/324; C08G 18/4829; C08G 18/36; C08G 18/7664; C08G 18/4244; C09J 175/04; C09J 175/08; B29C 65/48; B29C 65/4805

USPC .............. 428/423.1; 156/331.4; 528/74.5, 86
See application file for complete search history.

(56) References Cited

U.S. PATENT DOCUMENTS

| | | |
|---|---|---|
| 4,336,298 A | 6/1982 | Schwarz |
| 5,216,107 A | 6/1993 | Pedain et al. |
| 5,338,767 A | 8/1994 | Sartelet et al. |
| 6,107,355 A * | 8/2000 | Horn et al. ...................... 521/51 |
| 2004/0138402 A1 | 7/2004 | Thiele et al. |
| 2009/0214873 A1 | 8/2009 | Demmig |
| 2010/0216905 A1* | 8/2010 | Kuwamura et al. ........... 521/170 |
| 2010/0297427 A1 | 11/2010 | Schlingloff et al. |
| 2013/0102697 A1* | 4/2013 | Shinchi et al. ................ 521/173 |

FOREIGN PATENT DOCUMENTS

| | | |
|---|---|---|
| DE | 101 08 025 A1 | 9/2002 |
| EP | 1 690 880 A1 | 8/2006 |
| JP | H05-283061 A | 10/1993 |
| WO | WO 02/066572 A1 | 8/2002 |
| WO | WO 2006/084900 A2 | 8/2006 |
| WO | WO 2009/080740 A1 | 7/2009 |

OTHER PUBLICATIONS

Mar. 26, 2012 International Search Report issued in International Patent Application No. PCT/EP2011/073392.
Aug. 18, 2014 Office Action issued in Chinese Patent Application No. 201180062639.7 with translation.
Jul. 20, 2015 Opposition issued in European Patent Application No. 11807904.5.

\* cited by examiner

*Primary Examiner* — Thao T Tran
(74) *Attorney, Agent, or Firm* — Oliff PLC

(57) ABSTRACT

The invention relates to two-component polyurethane compositions which have a long open time and, even after extended exposure to a high-moisture climate (for example 70% relative humidity), even after 40 minutes, and in particular even after 60 minutes, can still be glued and cured to form polymers having high mechanical strength, whereby a structural adhesive bond is created. The composition comprises castor oil, at least one alkoxylated aromatic diol, at least one polyol having 5 to 8 hydroxyl groups, and at least one polyisocyanate. The two-component polyurethane compositions are suitable in particular for use as structural adhesives, in particular for the adhesive bonding of wing half-shells of rotor blades for wind power plants.

24 Claims, No Drawings

ADHESIVE FOR ROTOR BLADES FOR WIND POWER PLANTS

TECHNICAL FIELD

The invention relates to the field of two-component polyurethane adhesives, in particular to the structural two-component polyurethane adhesives and in particular the field of the adhering of rotor blades for wind power plants.

PRIOR ART

Two-component polyurethane adhesives based on polyols and polyisocyanates have already been used for a long time. Two-component polyurethane adhesives have the advantage that they rapidly cure after the mixing even at a non-elevated ambient temperature ("cold curing") and therefore can rapidly absorb rather high forces after a short time already. However, for the use as structural adhesives high demands are placed on the strengths and adhesive forces of such adhesives since such adhesives constitute elements of carrying structures. High strengths are usually achieved by high cross-linking density. This is usually achieved by elevating the concentration of functional groups and the use of higher-functional polyols or polyamines and higher-functional polyisocyanates.

WO 2006/084900 A2 discloses a two-component polyurethane adhesive that can be used as a structural adhesive.

However, in particular for the construction of rotor blades for wind power plants, where prefabricated wing half-shells with a carrier structure and, in addition, that must be adhered to each other with an exact fit, the previous two-component polyurethane adhesives have the big problem that they must have a long open time in order that the adhesive can be applied over a large area and that the joining process can take place in a time-staggered manner. The presence of elevated humidity leads to an increased side reaction of the isocyanate groups in the isocyanate component with water. The additional isocyanate groups are consumed that are no longer available for the construction of a cross-linked polyurethane. Furthermore, a foaming of the adhesive due to the development of carbon dioxide can occur. As a consequence, in the case of high humidity it can be observed in customary seasonal fluctuations or due to climatic particularities at the processing site, on the one hand that the reaction of the adhesive with humidity, in particular the open time of the adhesive, is greatly shortened and the mechanical properties of the cured adhesive sharply deteriorate.

WO 2009/080740 A1 discloses a two-component polyurethane adhesive that is suitable for the adhering of fibrous mold parts and is distinguished by the combination of a high molecular polyester diol, a highly functional polyols, a hydrophobic polyol and other auxiliary substances. However, these adhesives have a high rigidity with values for the E modulus of more than 2000 MPa and their mechanical properties could still be improved in the sense of an improvement of the mechanical viscosity.

PRESENTATION OF THE INVENTION

The present invention therefore has the problem of making available two-component polyurethane compositions that on the one hand have a long open time after application on a substrate and after a rather long exposure to a climate with high humidity (e.g., 70% relative humidity) can be joined (adhered) and cured to polymers with a high mechanical strength even after 40 minutes, in particular also even after 60 minutes, and in this manner a structural adhesive is produced.

It was now surprisingly found that a two-component polyurethane composition in accordance with claim 1 is capable of solving this problem.

It turned out that these compositions are optimally suited on account of their mechanical properties for being used as structural adhesives for adhering large-area mold parts, in particular of rotor blade half-shells during the construction of wind power plants. In particular, it turned out that the adhesives in accordance with the invention strike an especially good balance between tensile strength and strain at break as well as E modulus in the sense of a material modified in a viscous, elastic manner.

Other aspects of the invention form subject matter of other independent claims. Especially preferred embodiments of the invention form subject matter of the dependent claims.

WAYS OF CARRYING OUT THE INVENTION

The present invention relates to a two-component polyurethane composition consisting of a polyol component (K1) and a polyisocyanate component (K2).

The polyol component (K1) comprises
castor oil (A0);
at least one alcoxylated aromatic diol (A1); and
at least one polyol with 5 to 8 hydroxyl groups (A2).

The polyisocyanate component (K2) comprises at least one polyisocyanate (B1).

The prefix "poly" in designations of substances such as "polyol", polyisocyanate", polyether" or "polyamine" indicates in the present document that the particular substance formally contains more than one of the functional groups occurring in its designation per molecule.

The polyol component (K1) comprises castor oil (A0). Castor oil is a naturally regrowing raw material and is obtained from the seed of the castor shrub (*Ricinus communis*, spurge family). Castor oil is basically a triglyceride. Castor oil acid comprises hydroxyl groups. Consequently, castor oil is a hydrophobic polyol. Castor oil can be used raw or purified. The use of castor oil with a reduced content of free fatty acids (low FFA castor oil) proved to be especially suitable. Castor oil is preferably used for the content of free fatty acids of less than 5 wt %, in particular between 1 and 4 wt %.

The use of castor oil as a regrowing natural product in industrial products is ecologically extremely valuable and therefore very advantageous.

It is advantageous if the amount of castor oil (A0) in the polyol component (K1) is between 5 and 30 wt %, in particular between 10 and 25 wt %, preferably between 14 and 20 wt %.

The polyol component (K1) comprises at least one alkoxylated aromatic diol (A1).

"Aromatic diol" denotes here and in the following a diol that comprises as central unit at least one aromatic nucleus and two hydroxyl groups. Several aromatic nuclei can also be present in the diol. The hydroxyl groups are preferably not phenolic groups, i.e., they are advantageously not arranged directly on the aromatic nucleus.

The aromatic nucleus can also be condensed and/or comprise a hetero-aromatic substituent and/or other substituents. In a heteroaromatic nucleus hetero-atoms are present that are part of the aromatic ring or ring system.

Examples of such aromatic nuclei are substituted forms of benzene, naphthalene, anthracene, phenanthracene, imidazole, pyridine, pyrrole, pyrimidine, pyrazine, quinoline. Examples of diols with several aromatic nuclei are diols with the basic skeleton of a biphenyl, terphenyl, 2,2'-bipyridine, diphenyl methane, 1,1-diphenyl ethane or 2,2-diphenyl propane.

Aromatic diols proved to be especially suitable that are produced from phenol and from formaldehyde, acetaldehyde or acetone or mixtures of them, in particular bisphenol A, bisphenol F or bisphenol A/F.

The alcoxylated aromatic diol (A1) is preferably an ethoxylated and/or propoxylated aromatic diol.

Such alkoxylated diols preferably have the structure of the formula (I).

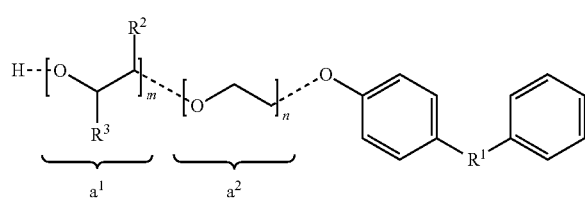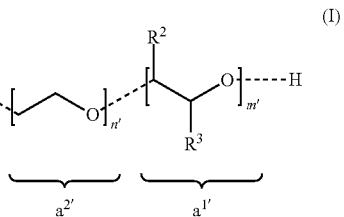

(I)

Here, the substituent $R^1$ represents a group $CH_2$, $CH(CH_3)$ or $C(CH_3)_2$.

The indices n, n', m and m' are such values that n+n'+m+m'=1 to 20, in particular n+n'+m+m'=1 to 8.

Furthermore, the substituents $R^2$ and $R^3$ accordingly represent $R^2$=H and $R^3$=methyl or $R^2$=methyl and $R^3$=H.

The segments $a^1$ and $a^{1'}$ signify an oxypropylene unit (PO) and $a^2$ and $a^{2'}$ an oxyethylene unit (EO). The dotted lines in formula (I) schematically show that the sequence of the alkylene glycol segments $a^1$, $a^{1'}$ and $a^2$ and $a^2$, that are connected to each other, is variable. Thus, a block-wise or an alternating or a random sequence of these oxyalkylene units is possible. The production of such alkoxylated aromatic diols takes place in a manner known to the person skilled in the art.

It is furthermore clear to the person skilled in the art that in the case of an alkoxylation of a diol even molecules with a different degree of alkoxylation can absolutely be produced in the two chains emanating from the central unit. Furthermore, it is also clear to the person skilled in the art that in the case of alkoxylations distributions of different molecules always occur. This is also shown, among other things, in the fact that the total degree of alkoxylation ("TAG")=n+n'+m+m') can also be an odd number or can assume a non-integral value.

Purely propoxylated aromatic diols with the formula (I) are preferred to purely ethoxylated or EO/PO-mixed alcoxylated aromatic diols with the formula (I), i.e., n is preferably=n'=0.

The aromatic diol (A1) is especially preferably a diol with the formula (I) with $R^1$=$CH_2$ or $C(CH_3)_2H$, in particular $C(CH_3)_2$.

Aromatic diols (A1) with the formula (I) with $R^1$=$C(CH_3)_2$, n=n'=0 and with a total degree of alkoxylation between 2 and 16, in particular between 2.5 and 16, preferably 3 to 12 proved to be the most preferable.

It can be advantageous that the two-component polyurethane composition also contains mixtures of different aromatic diols (A1).

The aromatic diol (A1) is preferably used in an amount of 2 to 15 wt % relative to the entire composition.

It is advantageous if the amount of aromatic diol (A1) in the polyol component (10) is between 5 and 15 wt %, in particular 8-15 wt %.

The polyol component (K1) comprises at least one polyol with 5 to 8 hydroxyl groups (A2). Such highly functional polyols are used relatively seldom in the adhesive branch normally as polyols since they have a strong cross-linking effect and therefore result in brittleness in most systems. Sugar alcohols as well as polyols based on sugar alcohol that have a corresponding number of OH groups, in particular pentites or hexites or those based on disaccharides are especially suitable. The corresponding sugars can also be used; however, the hydrogenated sugars are concerned. Examples are sorbitol, inositol, mannitol, adonitol, ribitol, xylitol, dulcitol, glucose, galactose, mannose, allose, altrose, gulose, idose, talose, fructose, sorbose, psicose, saccharose, lactose, trehalose, maltose, cellobiose, melibiose as well as rutinose. The corresponding products of ethoxylation and of propoxylation with up to 15 alkylene oxide units can also be used.

The molecular weight of such polyols with 5 to 8 hydroxyl groups (A2) can be 120 to 3000 g/mol, in particular 250 to 2000 g/mol.

Polyether polyols can also be used. Examples for them are reaction products of 5 to 6 functional alcohols that can be produced by reaction with ethylene oxide or propylene oxide.

Another group of suitable polyether polyols are the polytetramethylene glycols, in particular poly(THF)diols, that can be produced, e.g., by the acidic polymerization of tetrahydrofuran. Here the molecular weight of these polyether polyols is in general between 200 and 6000 g/mol, preferably in the range of 400 to 3000 g/mol.

The polyols with 5 to 8 hydroxyl groups (A2) have, on account of the high number of reactive OH groups, a rather high polarity. They are therefore at least partly miscible with water.

The polyol with 5 to 8 hydroxyl groups (A2) is preferably based on sorbitol. The polyol with 5 to 8 hydroxyl groups (A2) especially preferably has only secondary hydroxy groups.

It is advantageous if the amount of polyol with 5 to 8 hydroxyl groups (A2) in the polyol component (K1) is between 5 and 30 wt %, in particular between 0.5 and 20 wt %, preferably 1-10 wt %.

It is especially preferable if the polyol component (K1) also contains at least one aliphatic triol (A3). The aliphatic triol (A3) is an aliphatic triol with a molecular weight of preferably 360 to 6,000 g/mol, corresponding to an OH equivalent weight of 120 to 2,000, in particular to a molecular weight of 120 to 2000 g/mol, preferably 160 to 1,700 g/mol.

There are different types of such aliphatic triols. Thus, they can contain, for example, urethane groups and/or ureas groups and/or ether groups. The shape of the triols can be very different. Thus, for example, stellate or comb-shaped triols are possible. Furthermore, it is possible that primary as well as secondary hydroxyl groups are present in the triol. All three hydroxyl groups are preferably primary hydroxy groups.

For example, aliphatic triols (A3) can be obtained from an aliphatic triisocyanate, in particular from an isocyanurate that is formed from three diisocyanate molecules, in an excess of aliphatic diols, in particular of polyether diols, if necessary by further subsequent lengthening with aliphatic diisocyanates and aliphatic diols.

Other exemplary aliphatic triols (A3) can be obtained from low-molecular aliphatic triols such as, for example, trimethylol propane or glycerol and an aliphatic diisocyanate and subsequent reaction with an aliphatic diol.

Other exemplary aliphatic triols (A3) are products of an alkoxylation reaction of low-molecular aliphatic triols such as, for example, trimethylol propane or glycerol. They are in particular ethoxylated or propolylated or butoxylated aliphatic triols, in particular from trimethylol propane or glycerol.

It can be advantageous that the two-component polyurethane composition also contains mixtures of different aliphatic triols (A3). In particular, it proved to be advantageous that mixtures of an aliphatic triol (A3) with a lower molecular weight, in particular between 360 and 2,700 g/mol, with an aliphatic triol (A3) with a higher molecular weight, in particular between 4,200 and 6,000 g/mol are used.

It is furthermore preferred that the aliphatic triol (A3) is an alkoxylated aliphatic triol, in particular with a molecular weight between 500 and 1,000 g/mol, preferably between 550 and 800 g/mol. propoxylated and in particular butoxylated triols are preferred. Such an alkoxylation takes place in particular by treating the aliphatic triol with ethylene oxide, propylene oxide or butylene oxide.

A butoxylated trimethylol with a total degree of alkoxylation between 7 and 10 is most preferred.

It is advantageous if the amount of aliphatic triol (A3) in the polyol component (K1) does not exceed 30 wt %. The amount is preferably 0-25 wt %, especially preferably 7-25 wt %.

Furthermore, it is preferred if the polyol component (K1) also comprises at least one polyether polyol and/or polyester polyol based on castor oil or soybean oil (A4). Such polyether- and/or polyester polyols (A4) are preferably reaction products of castor oil with ketone raisins, in particular those marketed, for example, by Bayer under the designation Desmophen® 1150 and by Cognis under the designation Sovermol® 805.

Furthermore, it is preferred if the polyol component (K1) also contains at least one polyamine (PA) in an amount of 0.5 to 5 wt %, preferably 1.5 to 2.5 wt %.

Suitable polyamines (PA) are polyamines customary used in polyurethane chemistry, in particular, diamines. However, hydrophobic polyamines are more particularly suited, in particular aromatic polyamines. Especially preferred polyamines (PA) are aromatic diamines that have the formula (II):

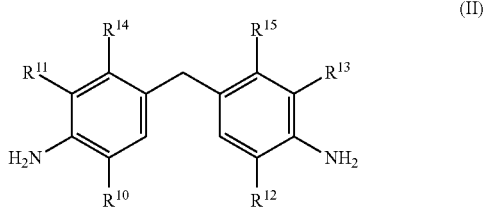

Here, $R^{10}$, $R^{11}$, $R^{12}$ and $R^{13}$ stand for H or a linear or branched $C_1$ to $C_4$ alkyl group on the condition that $R^{11}$ and $R^{13}$ do not stand for H at the same time. Furthermore, $R^{14}$ and $R^{15}$ stand for H or an atom of chlorine.

4,4'-methylene bis-(3-chloro, 2,6-diethyl)-aniline, 4,4'-methylene bis(3-chloro-2,6-diethylaniline), 4,4'-methylene bis(2,6-diethylaniline), 4,4'-methylene bis(2,6-diisopropylaniline) and 4,4'-methylene bis(2-isopropyl-6-methylaniline) are especially preferred.

Such aromatic polyamines are preferred over other aromatic polyamines since they are aromatic polyamines that are advantageous toxicologically.

The polyamine (PA) 4,4'-methylene bis(2,6-diethylaniline) is especially preferred.

Furthermore, the polyol component (K1) can comprise even other constituents. Curing catalysts are used with advantage. Such catalysts are known to the person skilled in the art for the reaction of polyisocyanates with polyols, optionally also with polyamines or water. Tin-, zinc- and bismuth organic metal catalysts, e.g., dibutyltindilauratae, or tertiary amines, e.g., 1,4-diazobicyclo[2.2.2] octane (DABCO) are cited as examples for such catalysts.

The pot life and the curing behavior as well as the viscosity of the mixture of the components (K1 and K2) and the rigidity of the applied adhesive can be advantageously influenced by the selection and concentration of suitable polyamines (PA).

Two-component polyurethane compositions are especially preferred that contain a polyol component (K1) containing:
10-25 wt % castor oil (A0),
8-15 wt % alcoxylated aromatic diol (A1)
1-10 wt % polyol with 5 to 8 hydroxyl groups (A2)
0-25 wt %, preferably 7-25 wt % aliphatic triol (A3).

The polyisocyanate component (K2) comprises at least one polyisocyanate (B1).

On the one hand, polyisocyanates (B1') that comprise, in addition to two or more free isocyanate groups, at least one urea group or a urethane group or a biuret group or a uretdione group are especially suitable as polyisocyanate (B1).

The polyisocyanate (B1) is preferably an aromatic polyisocyanate. Diphenylmethane diisocyanate (2,4'- and/or 4,4'-MDI) as well as MDI-based polyisocyanates are especially suitable. On the one hand, polyisocyanates of the type commercially obtainable as Desmodur® VH20 from Bayer proved to be especially suitable. Other suitable polyisocyanates (B1') are isocyanurates or biurets of a diisocyanate, in particular of HDI and/or IPDI and/or TDI.

It is absolutely possible that mixtures of polyisocyanates B1' are used.

In a preferred embodiment a mixture of mononuclear and polynuclear MDI (so-called polymeric MDI) is used. Desmodur® VKS20F by Bayer provide to be especially preferable as polyisocyanate (B1).

On the other hand, polyurethane prepolymers (B1") that comprise at least two isocyanate groups and that are formed from a reaction of at least one polyisocyanate with a molecular weight of less than 300 g/mol, in particular between 150 g/mol and 270 g/mol with at least one polyol (AB1) proved to be especially suitable as polyisocyanate (B1). In particular, polyols are suitable as polyol (AB1) that are selected from the group comprising polyether polyols, polyester polyols, polycarbonate polyols, polyols formed from unsaturated monomers and their mixtures. The production of such polyurethane prepolymers comprising isocyanate groups takes place in a known manner and typically takes place in a stoichiometric excess of the polyisocyanate in comparison to the polyol. Polyisocyanates used for this are in particular 2,4- and 2,6-toluylene diisocyanate (TDI), 2,4'- and 4,4'-diphenylmethane diisocyanate (MDI), 1,6-hexamethylene diisocyanate (HDI) as well as their isomeric mixtures and mixtures with each other. MDI is considered as especially preferred.

Polyether polyols, also called polyoxyalkylene polyols, are considered to be polymerization products of ethylene oxide, 1,2-propylene oxide, 1,2- or 2,3-butylene oxide, tetrahydrofuran or their mixtures, optionally polymerized with the aid of a starter molecule with two or more active hydrogen atom such as, e.g., water, ammonia or compounds with several OH— or NH groups such as, for example, 1,2-ethane diol, 1,2- and 1,3-propanediol, neopentyl glycol, diethylene glycol, triethylene glycol, the isomeric dipropylene glycols and tripropylene glycols, the isomeric butane diols, pentane diols, hexane diols, heptane diols, octane diols, nonane diols, decane diols, undecane diols, 1,3- and 1,4-cyclohexane dimethanol, bisphenol A, hydrogenated bisphenol A, 1,1,1-trimethylol ethane, 1,1,1-trimethylol propane, glycerol, aniline as well as mixtures of the previously cited compounds. Polyoxyalkylene polyols that have a low degree of unsaturation (measured according to ASTM D-2849-69 and indicated in milliequivalent unsaturation per gram polyol (mEq/g)), produced, for example, with the aid of so-called Double Metal Cyanide complex catalysts (DMC catalysts) as well as polyoxyalkylene polyols with a higher degree of unsaturation, produced, for example, with the aid of anionic catalysts such as NaOH, KOH or alkali alcoholates can be used.

Polyoxyalkylene diols or polyoxyalkylene triols, in particular polyoxypropylene diols or polyoxypropylene triols are especially suitable.

Polyoxyalkylene diols or polyoxyalkylene triols with a degree of unsaturation lower than 0.02 mEq/g and with a molecular weight in the range of 1,000 to 30,000 g/mol as well as polyoxypropylene diols and polyoxypropylene triols with a molecular weight of 400 to 8,000 g/mol are especially suitable. "Molecular weight" or "molar weight" always denotes in the present document the numerical average molecular weight $M_n$.

So-called "EO-endcapped" (ethylene oxide-endcapped) polyoxypropylene diols or polyoxypropylene triols are also especially suitable. The latter are special polyoxypropylene polyoxyethylene polyols that are obtained, for example, in that pure polyoxypropylene polyols are alkoxylated after the conclusion of the polypropoxylation with ethylene oxide and as a result comprise primary hydroxyl groups.

Polyester polyols are considered to be in particular polyols that are produced, for example, from bivalent to trivalent alcohols such as, 1,2-ethane diol, diethylene glycol, 1,2-propanediol, dipropylene glycol, 1,4-butane diol, 1,5-pentane diol, 1,6-hexane diol, neopentyl glycol, glycerol, 1,1,1-trimethylol propane or mixtures of the previously cited alcohols with organic dicarboxylic acids or their anhydrides or esters such as, for example, succinic acid, glutaric acid, adipic acid, suberic acid, sebacic acid, dodecanedioic carboxylic acid, maleic acid, fumaric acid, phthalic acid, isophthalic acid, terephthalic acid and hexahydrophthalic acid or mixtures of the previously cited acid as well as polyester polyols from lactones such as, for example, ε-caprolactone.

Preferred polycarbonate polyols are in particular those that are accessible by the reaction of the above-cited alcohols with dialkyl carbonates, diaryl carbonates or phosgene, which alcohols are used for the buildup of polyester polyols.

"Polyols built up from unsaturated monomers" are to be understood in particular as such polyols that are produced from the polymerization of at least one of the monomers selected from the group comprising ethylene, propylene, butylene, butadiene, isoprene, styrene, final alcohol, vinyl ether, vinyl ester, acrylonitrile, acids, amides and esters of acrylic acid, methacrylic acid, maleic acid, fumaric acid, crotonic acid and itaconic acid as well as their mixtures.

Especially suitable polyols built up from unsaturated monomers are considered to be hydroxy-functional polybutadienes such as polybutadiene polyols and hydrogenated polybutadiene polyols, as well as poly(meth)acrylate polyols. "(Meth)acrylate" always denotes here and in the following of the present document esters of acrylic acid as well as of methacrylic acid. Likewise, "(meth)acrylic acid denotes acrylic acid as well as methacrylic acid.

"Poly(meth)acrylate polyols" denote here polymers that are copolymers of a hydroxy-functional (meth)acrylic acid ester and of at least one other monomer that is selected from the group comprising the monomers acrylic acid, methacrylic acid, $C_1$-$C_{18}$ alkyl ester of acrylic acid or methacrylic acid, styrene, vinyl ester and vinyl alcohol. Hydroxyethyl(meth)acrylate, hydroxypropyl(meth)acrylate and hydroxybutyl (meth)acrylate are preferred as hydroxy-functional (meth) acrylic acid esters.

These cited polyols (AB1) preferably have an average molecular weight of 250 to 30,000 g/mol, in particular from 1,000 to 8,000 g/mol, and are preferably diols or triols, in particular with an average OH functionality in the range of 1.6 to 3.

In a preferred embodiment a mixture of polyols (AB1) is used that is a mixture of diols and triols.

In an embodiment of the invention the polyisocyanate component (K2) comprises at least one polyisocyanate (B1') and at least one polyisocyanate polyurethane prepolymer (B1").

The polyol component (K1) and/or the polyisocyanate component (K2) can comprise, in addition to the ones already mentioned, other constituents such as are known to the person skilled in the art from two-component polyurethane chemistry. They can be present in only one component or in both. For example, solvents, plasticisers and/or extenders, fillers such as carbon blacks, chalks or talcums, adhesion promoters, in particular trialkoxysilanes as well as thixotroping agents such as amorphous silicic acids, and drying agents such as zeolites are used as such additional constituents.

As the person skilled in the art of polyurethane adhesives knows, in the production of the components, in particular in the case of the polyisocyanate component (K2), care must be taken that the raw materials are as free of water as possible and that during and after their production no moisture, if possible, can come in contact with the component. This is achieved on the one hand by a physical or chemical drying of the initial substances and by working under inert gas, usually nitrogen, or by working under a vacuum.

The components (K1, K2) are advantageously formulated in such a manner that the volume ratio of polyol component (K1) and of polyisocyanate component (K2) is between 1:3 and 3:1, in particular between 1:2 and 2:1. This ratio is especially preferably approximately 1:1. The mixing ratio is preferably such that the NCO groups of the polyisocyanate component (K2) take place stoichiometrically to the NCO-reactive groups, typically OH groups, of the polyol component (K1). If the mixing does not take place substantially stoichiometrically, i.e., with deviations of more than 5%, the reaction of the polyol component (K1) and of the polyisocyanate component (K2) does not take place optimally, which leads to a reduction of the mechanical properties of the cured polyurethane composition. This applies in particular to an excess of the polyol component. If there is an excess of polyisocyanate, this is basically also disadvantageous, but as a result of the subsequent reaction of the nonreacted isocyanate groups with moisture, for example, coming from the humidity in the air, which can possibly result in further cross-linkings, defects in the polyurethane network structure and deteriorated mechanical properties resulting from them can be at least partially compensated.

The polyol component (K1) and polyisocyanate component (K2) are stored separately from one another before use and not mixed with one another until directly before being used. The components are advantageously present in a package consisting of two separate chambers in such a manner that the polyol component (K1) is in the one chamber and the polyisocyanate component (K2) is in the other chamber. The polyol component (K1) and the polyisocyanate component (K2) are filled into the chambers of the package and sealed tightly against air and moisture.

Preferred such packages are on the one hand side-by-side double cartridges or coaxial cartridges in which two tubular chambers are arranged adjacent to one another or into one another and sealed tightly against air and moisture with pistons. The components can be pressed out of the cartridge by the advance of these pistons. The tube sides opposite the pistons are optionally modified by an adapter in such a manner that the chamber openings are directly connected to one another in the area of the opening via a separating wall. A thread is advantageously attached in the area of the exit opening of the chambers so that a static mixer or a dynamic mixer can be tightly attached. Such packages are especially preferred for small usages, in particular for filling amounts up to 1 liter.

For larger usages, in particular for usages in industrial manufacture the polyol component (K1) and polyisocyanate component (K2) are advantageously filled into vats or large tin cans and stored. In this case the components are pressed out with hydraulic presses, in particular with consecutive plates, and supplied via lines to a mixing apparatus customarily used for two-component adhesives in industrial manufacture.

It is important for each package that at least the polyisocyanate component (K2) is tightly sealed against air and moisture so that both components can be stored for a long time, i.e., typically longer than 6 months.

It turned out that the weight ratio of castor oil (A0) to alkoxylated aromatic diol (A1) is advantageously 2 or greater than 2, in particular between 2 and 3 for the properties of the cured two-component polyurethane composition.

It furthermore turned out that the weight ratio of the weight sum of castor oil (A0) and alkoxylated aromatic diol (A1) to the weight sum of polyol with 5 to 8 hydroxyl groups (A2) and aliphatic triol (A3) advantageously has a value of 1.5-3.0 for the properties of the cured two-component polyurethane composition.

It furthermore turned out that the weight ratio of alkoxylated aromatic diol (A1) to the weight sum of castor oil (A0) and polyol with 5 to 8 hydroxyl groups (A2) and aliphatic triol (A3) advantageously has a value of 0.1-0.5, in particular 0.2-0.3 for the properties of the cured two-component polyurethane composition.

The two-component polyurethane composition is preferably flowable, but it can also display in particular thixotropic properties. The cured, two-component polyurethane composition has great mechanical strength, in particular a tensile strength (in the present document the value at break is always used), measured according to ISO 527-2 of more than 12 MPa, preferably more than 15 MPa, and most preferably more than 20 MPa. However, this tensile strength is typically less than 40 MPa. Furthermore, the cured, two-component polyurethane composition has a high E-modulus. It is, measured according to ISO 527-2, in particular more than 1,400 MPa, preferably more than 1,500 MPa and most preferably more than 1,600 MPa. The E-modulus of the composition of the invention should, however, be less than 2,400 MPa, preferably less than 2,000 MPa.

Furthermore, the cured, two-component polyurethane composition has a certain amount of elasticity. In particular, the elongation at break, measured according to ISO 527-2, is more than 2%, preferably more than 3%. However, this elongation at break is typically less than 15%.

Thus, the cured, two-component polyurethane composition has very high mechanical strength, that allows the two-component polyurethane composition to be used as adhesive for structural adherings.

In another aspect the invention relates to a method of adhesion comprising the steps:
Mixing the polyol component (K1) and the polyisocyanate component (K2) of a two-component polyurethane composition as it was described above in detail,
Applying the mixed two-component polyurethane composition onto at least one of the substrate surfaces to be adhered,
Joining within the open time,
Curing the two-component polyurethane composition.
These steps are taken in the indicated sequence.

The mixing typically takes place by static mixers or with the aid of dynamic mixers. Care is to be taking during the mixing that the two components are mixed as homogeneously as possible. If the two components are incompletely mixed, local deviations from the optimal mixing ratio, i.e., substantially of the optimal stoichiometry, occur which has as effect a deterioration of the mechanical properties of the cured, two-component polyurethane composition. In order to be also able to evaluate the mixing quality visually, it is advantageous if the polyol component (K1) and the polyisocyanate component (K2) have two different colors that can be readily distinguished visually from one another but also from the mixture. An example for such a color combination is present if the one component is black and the other white. A good mixture is present if a homogeneous, gray color is present and there are no strips or patterns in bright gray or dark gray or white or black.

The mixed polyurethane composition is applied onto at least one of the substance surfaces to be adhered. The substrate to be adhered is preferably a metal, plastic, glass or a ceramic material or a composite fiber material. It can be that two different substrates are present that are to be adhered. It is possible that the joining partner, i.e., the second substrate, is identical or different from the first substrate.

Thus, the application of the adhesive can take place on the first and/or on the second joining partner. After the application of the adhesive the joining partners are joined within the open time. The curing of the polyurethane composition takes place after the joining.

The preferred substrate is a plastic, in particular a fiber-reinforced plastic.

Such a fiber-reinforced plastic is a composite material consisting of fibers embedded in a matrix consisting of plastic.

Suitable fibers of such fiber-reinforced plastics are fibers selected from the list consisting of inorganic fibers, in particular glass fibers and ceramic fibers and organic fibers. The organic fibers are preferably aramid fibers, polyester fibers, nylon fibers, Plexiglas fibers, fibers of a homo- or copolymer of ethylene and/or propylene, natural fibers, textile fibers and carbon fibers. Carbon fibers are the most-preferred.

The fibers can be short fibers or long fibers, spun, woven or unwoven fibers or filaments. Furthermore, the fibers can be directed or stretched fibers. Furthermore, it can be advantageous to use fibers that are different in geometry as well as in composition with each other. The fibers are used in particular as woven fabric, non-woven fabric, or knit fabric or mats or fleeces or rovings. The intermediate spaces present here between the fibers are filled out by a plastic matrix. Suitable plastic matrices are selected from the list consisting of epoxide resin, unsaturated polyester resin, vinyl ester resin, phenol-formaldehyde resin, diallylphthalate resin, (meth-)acrylate resin, polyurethane, amino resins, melamine resin and urea resin. Epoxide resin is especially preferred as plastic matrix.

An especially preferred substrate to be adhered is a mold part based on glass fibers and/or carbon fibers in a polyester matrix or polyepoxide matrix. Such mold parts can be produced by different processes in a known manner from a polyester- or polyepoxide as well as from glass fibers and/or carbon fibers. Such form parts are used, for example in airplane construction, or for other structural parts that are highly stressed. A special area of application for such adhered substrates are rotor blades for wind power plants. Even the production methods for such mold parts are known to the person skilled in the art.

Such rotor blades for wind power plants are produced and hardened, for example, in hollow molds. The mold is frequently constructed as a semi-lateral mold. The side facing the mold is generally obtained in a smooth surface designed to be ready for use and the other side can and should usually still be worked. In a further manufacturing of the wings two or more of these substrates are adhered to each other. In addition, the wings are mechanically reinforced by the introduction of a wing truss structure. The adhesive in accordance with the invention ensures the connection of the half-shell profiles and of the wing truss structure. In general, the side facing away from the mold is used as the side to be adhered. The surface should preferably be constructed in such a manner that the substrate parts to be adhered have an approximately fitting form. The surface provided for the adhering can be rough and uneven. A grinding or milling to an exact mirror-inverted form to the counterpiece to be adhered is not necessary according to the invention. When using the adhesive of the invention a pretreatment of the surfaces to be adhered is also not necessary. A dust-free and fat-free surface is sufficient for applying the adhesive and the use of primers is not required.

A known manner of working is that the surfaces on the outer side of the mold parts are covered after the production of the parts in the mold with a tear-resistant protective fabric. This fabric can be directly and completely drawn off before the subsequent adhering and thus yield a suitable surface. However, it is also possible to work such surfaces in a mechanically coarse manner and adapt them to the corresponding counterpiece. The adhesive in accordance with the invention can then be applied onto the substrate surfaces prepared in this manner and freed of loose parts and dust.

The described two-component polyurethane composition has an open time that is especially well-suited for the adhering of large parts to be joined and/or mold parts. The open time describes the time within which after the mixing of the two components and the subsequent application of the adhesive the joining of the substrate parts is still possible before the adhesive has reacted so far that it is no longer capable of building up an adhesive composite.

Glass transition temperatures, measured according to ISO 11357, of more than 50° C., in particular more than 55° C. can be obtained with the cured compositions in accordance with the invention.

The two-component polyurethane composition typically has an open time of more than 60 minutes, in particular of between 60 minutes and 4 hours at room temperature and 50% rel. humidity.

A particularly great advantage of the present invention is the fact that the open time is still very long, i.e., at least 60 minutes even with high humidity, for example, 70% relative humidity. This is very surprising for a person skilled in the art on account of the known reaction of water and isocyanates.

This property allows the reliable realizing of large-area adhesive bonds largely independent of the humidity such as occur, for example, in factory halls during the construction of rotor blades for wind power plants. It is of course important here that the mechanical properties are not too heavily deteriorated conditioned by the high humidity.

The previously described method results in an adhered article that constitutes in particular an adhered rotor blade for being used in wind power plants.

The previously described two-component polyurethane composition can thus be used especially well as adhesive, in particular as structural adhesive. Typical examples for applications of such adhesives are found in buildings, automobiles, vehicles or ships or wind power plants. Here the cured adhesive is a part of a carrying structure and thus forms an important bonding member whose mechanical properties are subject to high demands. The present invention meets these high demands extremely well.

EXAMPLES

The following examples should illustrate the present invention:
However, the examples should not be considered as limiting the invention.

The compositions 1 and 2 as well as Ref. 1 to Ref. 5 as reference examples cited by way of example in table 1 all have the same component K2.

In order to produce the component K1 the polyol mixture was placed in a vacuum dissolver and agitated after the addition of catalyst and drying agent with the exclusion of moisture for 20 minutes at 25° C. Subsequently, these polyol components K1 were filled into air-tight and moisture-tight cartridges.

In the case of component K2 the polyisocyanate component B1 was filled into an air-tight and moisture-tight cartridge.

The components K1 and K2 were mixed with a static mixer in the weight ratio of K1:K2 as explained in table 1 (in accordance with an NCO/OH ratio of 1:1).

Measurements
E-Modulus, Tensile Strength and Elongation at Break

The mixed components K1 and K2 were mixed and immediately after the mixing dumbbells were produced according to ISO 527, part 2, 1B (ISO 527-2) which were cured for 24 h at 25° C. and subsequently for 72 h at 60° C. After a conditioning time of 24 h at 25° C. the E-modulus, tensile strength and elongation at break of the test pieces produced in this manner were measured according to ISO 527-2 on a Zwick Z020 traction test machine at a test temperature of 20° C. and a test speed of 2 mm/min.

Tensile Shear Strength

The mixed components K1 and K2 were mixed and applied onto the first platelet of glass fiber-reinforced epoxide resin (GRE) and subsequently immediately or after 40 or 60 minutes after exposure ($t_{exp}$) the production of the tensile shear strength test pieces (contacting with the second glass fiber-reinforced epoxide resin platelet, pressing, adhesive thickness 2 mm) was continued at 25° C. and 70% relative humidity. The adhesive was then cured for 24 h at 25° C. and subsequently 72 h at 60° C. and the tensile shear strength measured according to ISO 527 after a conditioning time of 24 h at 25° C.

In addition, the pot life as well as the glass transition temperature (Tg) of example 1 and example 2 were measured according to ISO 11,367. The tensile shear strength test pieces were produced in such a manner that the mixed adhesive was applied onto the first platelet and subsequently stored for 40 or 60 minutes ($t_{exp}$) after exposure at 25° C. and 70% relative humidity until the second platelet was brought in contact with the adhesive for the completion of the tensile shear strength test pieces. The adhesive was then cured 24 h at 25° C. and subsequently 72 h at 60° C. and the tensile shear strength measured after a conditioning time of 24 h at 25° C.

The comparison of example 1 and Ref. 1 and Ref. 2 shows that the presence of the alkoxylated aromatic diol exerts a significant influence on the mechanics, i.e., the tensile strength and the E-modulus. Furthermore, the comparison of example 1 and Ref. 3 and Ref. 4 shows that on the one hand the mechanics is deteriorated already at a standard climate (25° C., 100% rel. humidity) in that (for example) in the case of Ref. 3 the tensile strength drops in comparison to example 1, additionally, in the case of Ref. 3 and Ref. 4 the elongation at break is greatly lowered, and on the other hand in the case of Ref. 3 and Ref. 4 the E-modulus clearly rises if no castor oil is present in the formulation of the component K1, and that, in addition, in particular in the case of a long exposure to moisture in the case of Ref. 3 no more measuring results were able to be obtained for the tensile shear strength of the test pieces and the measuring results for the tensile shear strength of the

TABLE 1

Compositions and measured results.

| | | Examples | | | | | | |
|---|---|---|---|---|---|---|---|---|
| | | 1 | 2 | Ref. 1 | Ref. 2 | Ref. 3 | Ref. 4 | Ref. 5 |
| Component K1 | | A1 (GT³) | A2 (GT³) | RefA1 (GT³) | RefA2 (GT³) | RefA3 (GT³) | RefA4 (GT³) | RefA5 (GT³) |
| Castor oil | A0 | 16 | 16 | 16 | 16 | | | 16 |
| Propoxylated bisphenol-A (TAG = 3) | A1 | 7 | 7 | | | 21 | 21 | 7 |
| Polyetherpolyol based on sorbitol with 6 hydroxyl groups (hydroxyl number 490 mg KOH/g) | A2 | 8 | 8 | 8 | 8 | 8 | 8 | 0 |
| butoxylated trimethylolpropane (hydroxyl number 260 mg KOH/g) | A3 | 6 | | 6 | | 18 | 18 | 6 |
| Sovermol ® 805 | A4 | 31.3 | 31.3 | 31.3 | 31.3 | | 31.3 | 31.3 |
| Zeolite (drying agent) | | 6 | 6 | 6 | 6 | 6 | 6 | 6 |
| Chalk | | 22 | 22 | 22 | 22 | 22 | 22 | 22 |
| Pyrogenic silicic acid | | 1.5 | 1.5 | 1.5 | 1.5 | 1.5 | 1.5 | 1.5 |
| 4,4'-Methylene bis(2,6-diethylaniline) | PA | 2.2 | 2.2 | 2.2 | 2.2 | 2.2 | 2.2 | 2.2 |
| Total | | 100 | 94 | 93 | 87 | 78.7 | 110.0 | 92 |
| Component K2 | | (GT³) | (GT³) | (GT³) | (GT³) | (GT³) | (GT³) | (GT³) |
| Desmodur ® VKS20F | B1 | 100 | 100 | 100 | 100 | 100 | 100 | 100 |
| Mixing ratio K1/K2 [wt./wt.] | | 100/40 | 100/38.2 | 100/37.5 | 100/35.4 | 100/47.8 | 100/46.9 | 100/32.4 |
| Tensile strength [MPa] | | 37.0 | 36.8 | 27.9 | 26.1 | 25.4 | 48.2 | 18.18 |
| Elongation at break [%] | | 3.5 | 3.9 | 9.1 | 8.5 | 1.1 | 2.5 | 31.5 |
| E-modulus [MPa] | | 1707 | 1759 | 1329 | 1194 | 2466 | 2099 | 222 |
| $t_{exp}$: 0 min. (25° C., 70% rel. LF¹) Tensile shear strength [MPa] | | 12.0 | 10.4 | 10.7 | 16.1 | 11.8 | 11.6 | 15.5 |
| $t_{exp}$: 40 min. (25° C., 70% rel. LF¹) Tensile shear strength [MPa] | | 9.9 | 8.3 | 9.0 | 11.5 | 4.9 | 7.7 | 14.2 |
| $T_{exp}$: 60 min. (25° C., 70% rel. LF¹) Tensile shear strength [MPa] | | 6.9 | 5.2 | 5.5 | 10.9 | —² | 3.3 | 12.0 |
| Tg [° C.] | | 57 | 55.5 | n.g.⁴ | n.g.⁴ | n.g.⁴ | n.g.⁴ | n.g.⁴ |
| Pot life [min.] | | 63 | 57 | n.g.⁴ | n.g.⁴ | n.g.⁴ | n.g.⁴ | n.g.⁴ |

¹rel. LF = relative humidity
²not measurable, too brittle
³GT = parts by weight
⁴not measured test pieces sharply deteriorated in the case of Ref. 4. The reaction of the isocyanate groups with water had therefore already progressed so far in the case of these test pieces after 60 minutes of exposure to moisture that after an exposure of 60 minutes the open time of Ref. 3 had already been exceeded. However, it turned out already after 40 minutes of exposure to moisture that Ref. 3 displayed massively worse mechanical values than the corresponding example 1.

In addition, the comparison of examples 1 and 2 shows that the already excellent properties of example 2 can be improved more by using an aliphatic triol.

The invention claimed is:

1. A two-component polyurethane composition consisting of a polyol component and a polyisocyanate component, wherein:
   the polyol component comprises:
      castor oil;
      at least one alkoxylated aromatic diol;
      at least one polyol with 5 to 8 hydroxyl groups; and
      optionally, an aliphatic triol;
   the polyisocyanate component comprises at least one polyisocyanate; and
   a weight ratio of a total amount of the castor oil and the alkoxylated aromatic diol to a total amount of the polyol with 5 to 8 hydroxyl groups and the aliphatic triol is 1.5 to 3.0.

2. The two-component polyurethane composition according to claim 1, wherein the alkoxylated aromatic diol is an ethoxylated and/or a propoxylated aromatic diol.

3. The two-component polyurethane composition according to claim 2, wherein the alkoxylated aromatic diol is represented by the following formula (I):

$$H{-}{-}{\left[O{-}{\underset{R^3}{\underset{|}{\overset{R^2}{\overset{|}{C}}}}\right]}_m {-}{-}{\left[O{-}CH_2CH_2\right]}_n{-}O{-}\bigcirc{-}R^1{-}\bigcirc{-}O{-}{\left[O\right]}_{n'}{-}{-}{\left[\underset{R^3}{\underset{|}{\overset{R^2}{\overset{|}{C}}}}{-}O\right]}_{m'}{-}{-}H \quad (I)$$

$\underbrace{\phantom{xxx}}_{a^1} \underbrace{\phantom{xxx}}_{a^2} \underbrace{\phantom{xxx}}_{a^{2'}} \underbrace{\phantom{xxx}}_{a^{1'}}$ in which
$R^1=CH_2$, $CH(CH_3)$ or $C(CH_3)_2$,
$R^2=H$ and $R^3=$methyl, or $R^2=$methyl and $R^3=H$,
$n+n'+m+m'=1$ to 20, and
the dotted lines show that the sequence of the alkylene glycol segments $a^1$ and $a^2$ that are connected to each other, and $a^{1'}$ and $a^{2'}$ that are connected to each other, is variable.

4. The two-component polyurethane composition according to claim 3, wherein $n=n'=0$.

5. The two-component polyurethane composition according to claim 3, wherein $n+n'+m+m'=1$ to 8.

6. The two-component polyurethane composition according to claim 3, wherein $R^1=CH_2$ or $CH(CH_3)$.

7. The two-component polyurethane composition according to claim 1, wherein the polyol with 5 to 8 hydroxyl groups is a polyetherpolyol based on a sugar.

8. The two-component polyurethane composition according to claim 7, wherein the polyol with 5 to 8 hydroxyl groups is a polyetherpolyol based on sorbitol.

9. The two-component polyurethane composition according to claim 1, wherein the polyol component comprises the aliphatic triol.

10. The two-component polyurethane composition according to claim 9, wherein the aliphatic triol is an alkoxylated aliphatic triol.

11. The two-component polyurethane composition according to claim 10, wherein the alkoxylated aliphatic triol has a molecular weight between 500 and 1,000 g/mol.

12. The two-component polyurethane composition according to claim 1, wherein the polyisocyanate is an aromatic polyisocyanate.

13. The two-component polyurethane composition according to claim 1, wherein the polyol component further comprises a polyamine in an amount of 1.5 to 2.5 wt %.

14. The two-component polyurethane composition according to claim 1, wherein the polyol component further comprises a polyamine selected from the group consisting of 4,4'-methylene bis-(3-chloro,2,6-diethyl)-aniline, 4,4'-methylene bis(3-chloro-2,6-diethylaniline), 4,4'-methylene bis(2,6-diethylaniline), 4,4'-methylene bis(2,6-diisopropylaniline) and 4,4'-methylene bis(2-isopropyl-6-methylaniline).

15. The two-component polyurethane composition according to claim 1, wherein a weight ratio of an amount of the castor oil to an amount of the alkoxylated aromatic diol is greater than or equal to 2.

16. The two-component polyurethane composition according to claim 1, wherein the polyol component further comprises a polyamine in an amount of 0.5 to 5 wt %.

17. A method of adhering a plurality of substrate surfaces, the method comprising:
   mixing the polyol component and the polyisocyanate component of the two-component polyurethane composition according to claim 1,
   applying the mixed two-component polyurethane composition onto at least one of the substrate surfaces,
   joining the substrate surfaces within an open time, and
   curing the polyurethane composition.

18. The method according to claim 17, wherein at least one of the substrates is formed of a plastic.

19. The method according to claim 17, wherein at least one of the substrates is a mold part based on glass fibers and/or carbon fibers in a polyester matrix or polyepoxide matrix.

20. An adhered article formed by adhering the substrate surfaces by the method according to claim 17.

21. A two-component polyurethane composition consisting of a polyol component and a polyisocyanate component, wherein:
   the polyol component comprises:
      castor oil;
      at lead one alkoxylated aromatic diol;
      at least one polyol with 5 to 8 hydroxyl groups; and
      optionally, an aliphatic triol;
   the polyisocyanate component comprises at least one polyisocyanate, and a weight ratio of an amount of alkoxylated aromatic diol to a total amount of the castor oil, the polyol with 5 to 8 hydroxyl groups, and the aliphatic triol is 0.1 to 0.5.

22. A two-component polyurethane composition consisting of a polyol component and a polyisocyanate component, wherein:
the polyol component contains:
5-30 wt % castor oil,
2-15 wt % alkoxylated aromatic diol,
0.5-30 wt % polyol with 5 to 8 hydroxyl groups, and
0-30 wt % aliphatic triol, and
the polyisocyanate component comprises at least one polyisocyanate.

23. The two-component polyurethane composition according to claim 22, wherein the polyol component contains:
10-25 wt % castor oil,
8-15 wt % alkoxylated aromatic diol,
1-10 wt % polyol with 5 to 8 hydroxyl groups, and
0-25 wt % aliphatic triol.

24. The two-component polyurethane composition according to claim 22, wherein the polyol component contains 7-25 wt % aliphatic triol.

* * * * *